United States Patent [19]

Tabata et al.

[11] 3,718,558
[45] Feb. 27, 1973

[54] PROCESS FOR PRODUCING A CROSS-LINKED COPOLYMER OF TETRAFLUOROETHYLENE AND PROPYLENE USING HIGH ENERGY IONIZING RADIATION

[75] Inventors: Yoneho Tabata, Matsudo; Gen Kojima, Tokyo, both of Japan

[73] Assignee: Asahi Glass Company Ltd., Tokyo, Japan

[22] Filed: Dec. 11, 1970

[21] Appl. No.: 97,387

[30] Foreign Application Priority Data

Dec. 11, 1969  Japan..................................44/99615

[52] U.S. Cl. ...........................204/159.2, 260/87.5 B

[51] Int. Cl. ..............................C08d 1/00, C08f 1/16

[58] Field of Search ......204/159.22, 159.2; 260/92.8

[56] References Cited

UNITED STATES PATENTS 3,556,965  1/1971  D'Agostino et al................204/159.2
3,467,635  9/1969  Brasen et al........................260/80.76

OTHER PUBLICATIONS

Tabata et al., Radiation Induced Copolymorization of TFE With Propylene at Low Temperature, J. of Polymer Science; part 4, Vol. 2, pp. 2235–2243 (1964)

Primary Examiner—Murray Tillman
Assistant Examiner—Richard B. Turer
Attorney—Oblon, Fisher & Spivak

[57] ABSTRACT

A cross-linked copolymer of tetrafluoroethylene and propylene is produced by irradiating a copolymer of tetrafluoroethylene and propylene in the absence of monomers of tetrafluoroethylene, propylene, or other copolymerizable monomer, with high energy ionizing radiation.

6 Claims, No Drawings

PROCESS FOR PRODUCING A CROSS-LINKED COPOLYMER OF TETRAFLUOROETHYLENE AND PROPYLENE USING HIGH ENERGY IONIZING RADIATION

BACKGROUND OF THE INVENTION

1. Field of the Invention

This invention relates generally to a technique for cross-linking copolymers of tetrafluoroethylene and more particularly to a technique using high energy ionizing radiation.

2. Description of the Prior Art

Copolymers of tetrafluoroethylene and propylene, known as fluorine-containing elastomers, are disclosed in U.S. Pat. No. 3,467,635. In that reference, it is disclosed that copolymers of tetrafluoroethylene and propylene can be cross-linked with a curing agent such as a peroxide or an amine. When these types of curing agents are used, however, the curing agent becomes incorporated into the resultant cross-linked copolymer, so that its characteristic heat resistance, mechanical strength and/or electrical properties are adversely affected. Moreover, it has been found that conventional cross-linking agents provide only reduced cross-linking efficiency when used for cross-linking copolymers of tetrafluoroethylene and an olefin and the degree of cross-linking with conventional cross-linking agents is usually insufficient to provide a copolymer of adequate mechanical strength.

In order to provide a copolymer of tetrafluoroethylene and propylene of high mechanical strength, it has been heretofore necessary to provide a terpolymer with a suitable cure-site monomer. Upon cross-linking the terpolymer, the cure-site monomer provided sufficient cross-linking to yield a high mechanical strength fluorine containing elastomer. A need exists, however, for a copolymer elastomer having good mechanical and electrical properties.

SUMMARY OF THE INVENTION

Accordingly, it is an object of the present invention to provide a novel cross-linked copolymer of tetrafluoroethylene and propylene having high heat resistance, good mechanical strength and excellent electrical properties.

It is a further object of the present invention to provide a cross-linked copolymer of tetrafluoroethylene and propylene which contains no impurity which might reduce the excellent properties of the copolymer.

It is a still further object of the present invention to provide a process for producing a cross-linked copolymer of tetrafluoroethylene and propylene with high cross-linking efficiency.

A further object of this invention is to provide a cross-linking process which can be used for shaped articles composed of copolymers of tetrafluoroethylene and propylene.

These and other objects have now herein been attained by irradiating the copolymer of tetrafluoroethylene and propylene with high energy ionizing radiation.

DETAILED DESCRIPTION OF THE PREFERRED EMBODIMENTS

The tetrafluoroethylene-propylene copolymer used in the present invention can be provided by conventional bulk polymerization, solution polymerization, suspension polymerization, emulsion polymerization, or the like. Also, these copolymers can be produced by using conventional catalyst systems, using a polymerization initiator, thermopolymerization, photopolymerization, or polymerization by use of ionizing radiation, etc. Copolymers of tetrafluoroethylene and propylene which contain minor amounts of other copolymerizable components, such as ethylene, isobutylene, acrylic acid, vinylfluoride, hexafluoropropylene, vinylidene-fluoride, chlorotrifluoroethylene, and chloroethylvinylether, etc., can also be used in the present invention.

The molar ratio of tetrafluoroethylene to propylene in the copolymer can be selected over broad ranges, such as tetrafluoroethylene/propylene (molar ratio) or 90/10 – 20/80, and preferably 70/30 – 30/70, especially 60/40 – 45/55. The molecular weight of the copolymer and the molar ratio of the components can be selected according to the properties and applications required of the end product.

In the process of the present invention, it is preferable to use a copolymer of tetrafluoroethylene and propylene having a M.W. of greater than 20,000 and having an intrinsic viscosity in tetrahydrofuran at 30° C. of greater than 0.25.

It is rather difficult to cross-link this type of copolymer if the M.W. is less than 20,000 to form a high mechanical strength copolymer even with the use of ionizing radiation. For example, a copolymer of tetrafluoroethylene and propylene which has an M.W. of about 18,000, cross-linked with 10 – 50 Mrad of high energy ionizing radiation is characterized by an ultimate tensile strength of only 38 – 45 kg/cm².

It is possible to yield a cross-linked copolymer having an ultimate tensile strength of greater than 50 kg/cm², however, and especially more than 80 kg/cm² without any reinforcing material, by using copolymers of tetrafluoroethylene and propylene having molecular weights of greater than 20,000 when treated in accordance with the process of the present invention. Suitable high energy ionizing radiation for the present invention includes $\alpha$-rays, $\beta$-rays, $\alpha$-rays, X-rays, accelerating particle rays, neutron rays, and electron beams. It is preferable, however, to use a higher energy form of ionizing radiation. Any type of ionizing radiation source can be used, e.g., cobalt–60, cesium–137 and krypton–83, atomic energy generator, such as an atomic reactor, various types of particle accelerators, X-rays generators, and electron beam generators, etc. In general, it is preferable to use $\alpha$-rays from a cobalt–60 source, accelerating particle rays and electron beams.

The dose rate and total dose of the high energy ionizing radiation are not particularly limited; however, when the total dose is too low, it is difficult to provide sufficient cross-linking and the desirable ultimate tensile strength can not be obtained. The dose rate is selected depending upon the time of radiation and other factors. When the dose rate is too high, the physical properties of the resultant cross-linked copolymer will be adversely affected, while when the dose rate is too low, cross-linking occurs too slowly.

In the industrial operation of this process, it is preferable to use a dose rate in the range of $10^2 - 10^9$ roentgens/hour, and preferably $10^3 - 5 \times 10^7$ roentgens/hour. The total dose should be in the range of about $10^4 - 10^8$ rads. In general, the particular dose and dose rate will depend upon the particular molecular weight of copolymer.

It has been found that an excess of irradiation will cause a decrease in the ultimate elongation of the resultant cross-linked copolymer and a decrease in the ultimate tensile strength and the heat resistance of the copolymer.

It is not clear why the ultimate tensile strength and the decomposition temperature of the resulting cross-linked copolymer are decreased by an excess amount of ionizing radiation. However, it is presumed that main chain scission of the copolymer occurs concurrently with the cross-linking reaction. For example, when a low molecular weight copolymer of tetrafluoroethylene and propylene is irradiated, the ultimate tensile strength of the resulting cross-linked copolymer will usually be too low. If excess cross-linking occurs, such as when it is desired to increase the ultimate tensile strength, the ultimate elongation will become too low.

It is difficult to increase the ultimate tensile strength of the resulting copolymer beyond a specific degree by increasing the total dose of ionizing radiation, since main chain scission will occur which will adversely affect the ultimate tensile strength. This might be the reason why a high ultimate tensile strength cross-linked copolymer cannot be produced using linear copolymers of tetrafluoroethylene and propylene of less than 20,000 molecular weight.

Excess irradiation will also cause main chain scission of copolymers having molecular weight of more than 20,000, thereby causing undesirable decreases in the mechanical properties of the resultant copolymer, and accordingly, it is important that the total dose be carefully controlled. As specified above, in general the total dose required is dependent upon the molecular weight of the copolymer. It is preferable to use a dose of $10^5-5 \times 10^7$ rads, and especially 5 – 40 Mrads to produce a cross-linked copolymer of tetrafluoroethylene and propylene having an ultimate tensile strength of more than 50 kg/cm$^2$ and preferably more than 80 kg/cm$^2$, an ultimate elongation of more than 200 percent, and a decomposition temperature of more than 300° C.

The process of the present invention can be applied to various forms of tetrafluoroethylene-propylene copolymers such as shaped articles of film, sheet, pipe, rods, rings, coated membranes, powders or granules. It is preferable, however, to apply the radiation treatment in the absence of any monomers of tetrafluoroethylene, propylene, or other copolymerizable monomer, etc., especially when the copolymer is in the form of a shaped article.

The copolymer can be subjected to the radiation treatment in air; however, it is preferable to effect radiation in vacuum or in argon, helium or nitrogen. It is also possible to irradiate the copolymer in water. The cross-linking reaction is usually conducted in high efficiency at room temperature. However, it is possible to irradiate at about 100° C. or more.

Copolymers of tetrafluoroethylene and propylene, which are difficult to cross-link by conventional methods, can be readily cross-linked using the techniques of the present invention to yield a product having an ultimate tensile strength of greater than 50 kg/cm$^2$, an ultimate elongation of greater than 200 percent, and a decomposition temperature of more than 300° C., and which is further characterized by good heat resistance.

Having generally described the invention, a further understanding can be obtained by reference to certain specific Examples which are provided herein for purposes of illustration only and are not intended to be limiting in any manner.

EXAMPLES 1 – 8

High energy ionizing radiation from a cobalt–60 source or an electron beam was used to irradiate each film of a copolymer of tetrafluoroethylene and propylene, average molecular weight of about 30,000, intrinsic viscosity in tetrahydrofuran at 30° C. of 0.36 (molar ratio of $C_2F_4$:$C_3H_6$ of 51:49) which resulted in the formation of the following cross-linked copolymer. The properties of each cross-linked copolymer were measured to provide the following results as shown in Table 1.

As the test of physical properties, ultimate tensile strength (kg/cm$^2$) and ultimate elongation (percent) were measured at 500 mm./min. velocity at 25° C. Thermal decomposition temperature (° C.) was measured by use of a thermo-balance.

It was found that this copolymer had an ultimate tensile strength of 3 kg/cm$^2$, an ultimate elongation of 300 percent, and a decomposition temperature of 360° C.

TABLE 1

| No. | Type of radioactive rays | Condition of irradiation | | | | | Cross-linked copolymer | | |
|---|---|---|---|---|---|---|---|---|---|
| | | Irradiation temp. (° C.) | Atmosphere | Dose rate | Energy (m.e.v.) | Total dose (Mrad.) | Strength (kg./cm.$^2$) | Elongation (percent) | Decomposition temp. (° C.) |
| 1 | γ-rays | 25 | In air | $10^5$ γ/hr | 1.25 | 20 | 85 | 700 | 345 |
| 2 | do | 25 | do | do | 1.25 | 40 | 80 | 210 | 350 |
| 3 | do | 25 | In vacuum | do | 1.25 | 20 | 95 | 800 | 340 |
| 4 | do | 100 | do | do | 1.25 | 5 | 100 | 500 | 330 |
| 5 | Electron beam | 25–40 | In air | 0.5 μA./cm.$^2$ | 1.5 | 20 | 95 | 850 | 340 |
| 6 | do | 25–40 | do | 1.5 μA./cm.$^2$ | 1.5 | 90 | 90 | 650 | 335 |
| 7 | do | 25–40 | do | 0.5 μA./cm.$^2$ | 2.5 | 25 | 90 | 700 | 340 |
| 8 | do | 25–40 | do | 0.5 μA./cm.$^2$ | 1.5 | 40 | 85 | 250 | 330 |

EXAMPLES 9 – 13

Various copolymers of tetrafluoroethylene and propylene having various average molecular weights were respectively shaped into sheets having 1 mm. of thickness. α-Rays from a cobalt–60 source were used to irradiate the samples at a dose rate of $10^6$ roentgens/hour in vacuum at a total dose of 10 Mrad. to result in a cross-linked copolymer. Each cross-linked copolymer sheet was cut into the form of a dumbbell and the physical properties of the product were measured by the test methods shown in Example 1 to provide the results as shown in Table 2.

TABLE 2

| No. | Copolymer | | | Cross-linked Copolymer | | |
|---|---|---|---|---|---|---|
| | Average molecular weight | intrinsic viscosity | $C_2F_4/C_3H_6$ | Strength (kg/cm$^2$) | Elongation (%) | Decomposition temperature (°C.) |
| 9 | 1.8 x10$^4$ | 0.22 | 50/50 | 38 | 480 | 350 |
| 10 | 2.0 x10$^4$ | 0.25 | 51/49 | 50 | 480 | 350 |
| 11 | 3.0 x10$^4$ | 0.36 | 51/49 | 163 | 213 | 345 |
| 12 | 5.0 x10$^4$ | 0.55 | 52/48 | 130 | 500 | 350 |
| 13 | 6.7 x10$^4$ | 0.72 | 51/49 | 137 | 495 | 350 |

EXAMPLES 14 – 18

A copolymer of tetrafluoroethylene and propylene having an average molecular weight of 3,000, an intrinsic viscosity in tetrahydrofuran at 30° C. of 0.36, and a molar ratio of $C_2F_4:C_3H_6$ of 51:49 was formed into a sheet as shown in Example 9. α-Rays from a cobalt–60 source, dose rate of 10$^6$ roentgens/hour, were used to irradiate each sample in air at room temperature to result in cross-linkage.

The physical properties of resultant cross-linked copolymers obtained under various total doses were measured by the test methods shown in Example 1 to provide the following results as shown in Table 3.

TABLE 3

| No. | Total Dose (Mrad.) | Cross-linked Copolymer | | |
|---|---|---|---|---|
| | | strength (kg/cm$^2$) | Elongation (%) | Decomposition temperature (°C.) |
| 14 | 5 | 55 | 1,000 | 355 |
| 15 | 10 | 80 | 480 | 355 |
| 16 | 20 | 101 | 313 | 345 |
| 17 | 40 | 117 | 247 | 340 |
| 18 | 50 | 100 | 205 | 330 |

EXAMPLES 19 – 23

Electron beams of 1.5 MeV energy and 0.48 μA/cm$^2$ electron density were used to irradiate sheets of copolymers of tetrafluoroethylene and propylene shown in Example 14 in air at room temperature to result in cross-linkage.

The physical properties of resultant cross-linked copolymers obtained at various doses were measured by the test methods shown in Example 1 to provide the following results shown in Table 4.

TABLE 4

| No. | Total Dose (Mrad) | Cross-linked Copolymer | | |
|---|---|---|---|---|
| | | strength (kg/cm$^2$) | Elongation (%) | Decomposition temperature (°C.) |
| 19 | 5 | 52 | 1200 | 360 |
| 20 | 10 | 65 | 530 | 352 |
| 21 | 20 | 80 | 373 | 344 |
| 22 | 40 | 105 | 270 | 346 |
| 23 | 50 | 76 | 220 | 340 |

Having now fully described the invention, it will be apparent to one of ordinary skill in the art that many changes and modifications can be made thereto without departing from the spirit or scope of the invention.

What is claimed as new and intended to be covered by letters patent of the United States is:

1. A process for producing a cross-linked copolymer of tetrafluoroethylene and propylene which comprises subjecting a copolymer of tetrafluoroethylene and propylene, wherein the mole ratio of the tetrafluoroethylene to propylene is from 90/10 to 20/80, the average molecular weight is greater than 20,000, and the intrinsic viscosity in tetrahydrofuran at 30° C is more than 0.25, to high energy ionizing radiation at a dose rate of from 10$^2$ – 10$^9$ roentgens/hour and a total dose of 10$^4$ – 10$^8$ rads.

2. The process of claim 1 in which said copolymer is irradiated in the absence of any monomer of tetrafluoroethylene, propylene, or other copolymerizable monomer.

3. The process of claim 1, in which a shaped copolymer of tetrafluoroethylene and propylene is exposed to the irradiation treatment.

4. The process of claim 1, wherein the total dose is from 10$^5$ – 5 × 10$^7$ Rads.

5. The process of claim 1, wherein said copolymer is irradiated in vacuum.

6. A cross-linked copolymer of tetrafluoroethylene and propylene which is characterized by an ultimate elongation of greater than 200%, an ultimate tensile strength of greater than 80 kg/cm$^2$, and a decomposition temperature of more than 300° C. which is produced by irradiating a copolymer of tetrafluoroethylene and propylene having an average molecular weight of more than 20,000 and an intrinsic viscosity in tetrahydrofuran at 30° C. of more than 0.25, wherein the mole ratio of tetrafluoroethylene to propylene is from 90/10 to 20/80, with high energy ionizing radiation at a total dose of 10$^5$ – 5 × 10$^7$ Rads, and a dose rate of 10$^2$ to 10$^9$ roentgens/hour.

* * * * *